United States Patent
Lin et al.

(10) Patent No.: US 11,231,750 B2
(45) Date of Patent: Jan. 25, 2022

(54) SHOCKPROOF ELEMENT AND ELECTRONIC DEVICE

(71) Applicant: PEGATRON CORPORATION, Taipei (TW)

(72) Inventors: Chiao-Yi Lin, Taipei (TW); Po-Chun Chen, Taipei (TW)

(73) Assignee: Pegatron Corporation, Taipei (TW)

( * ) Notice: Subject to any disclaimer, the term of this patent is extended or adjusted under 35 U.S.C. 154(b) by 161 days.

(21) Appl. No.: 16/844,425

(22) Filed: Apr. 9, 2020

(65) Prior Publication Data

US 2020/0326755 A1    Oct. 15, 2020

(30) Foreign Application Priority Data

Apr. 9, 2019 (TW) ................................. 108112342

(51) Int. Cl.
*G06F 1/16* (2006.01)
*F16F 15/04* (2006.01)

(52) U.S. Cl.
CPC ............ *G06F 1/1658* (2013.01); *F16F 15/04* (2013.01)

(58) Field of Classification Search
CPC ......... G06F 1/1658; G06F 1/187; F16F 15/04
See application file for complete search history.

(56) References Cited

U.S. PATENT DOCUMENTS

| | | | |
|---|---|---|---|
| 4,683,520 A * | 7/1987 | Grassens | H02B 1/54 211/26 |
| 4,713,714 A * | 12/1987 | Gatti | G11B 33/08 248/581 |
| 4,979,062 A * | 12/1990 | Stefansky | G11B 23/021 360/137 |
| 5,131,619 A * | 7/1992 | Daugherty | F16F 1/3605 248/635 |
| 5,535,092 A * | 7/1996 | Bang | G11B 33/121 361/679.34 |
| 5,654,875 A * | 8/1997 | Lawson | G11B 33/124 248/638 |
| 6,122,165 A * | 9/2000 | Schmitt | G06F 1/184 361/679.31 |

(Continued)

FOREIGN PATENT DOCUMENTS

| | | |
|---|---|---|
| CN | 103161862 A | 6/2013 |
| CN | 206398007 U | 8/2017 |

(Continued)

*Primary Examiner* — Adrian S Wilson

(74) *Attorney, Agent, or Firm* — Muncy, Geissler, Olds & Lowe, P.C.

(57) ABSTRACT

A shockproof element is applied to an electronic element. The shockproof element includes a first elastic portion, a second elastic portion and a connecting portion. The first elastic portion defines an opening. The second elastic portion is disposed corresponding to the first elastic portion. The second elastic portion includes a hollow column. The hollow column extends from the second elastic portion into the opening of the first elastic portion. The hollow column can fix the electronic element, and the first elastic portion and the second elastic portion jointly hold the electronic element. The connecting portion connects to the first elastic portion and the second elastic portion. An electronic device, which includes the shockproof element, the electronic element, a first housing and a second housing, is also provided.

16 Claims, 8 Drawing Sheets

(56) References Cited

U.S. PATENT DOCUMENTS

| | | | | |
|---|---|---|---|---|
| 6,249,504 B1* | 6/2001 | Iwanaga | ........... | F16F 1/377 720/692 |
| 6,496,362 B2* | 12/2002 | Osterhout | ........... | G11B 33/08 206/586 |
| 6,646,977 B2* | 11/2003 | Chen | ........... | G11B 7/08582 720/692 |
| 6,671,124 B2* | 12/2003 | Guion | ........... | G11B 33/08 248/603 |
| 6,762,932 B2* | 7/2004 | Regimbal | ........... | G06F 1/184 361/679.33 |
| 6,882,528 B2* | 4/2005 | Chuang | ........... | G11B 33/08 312/223.1 |
| 7,016,189 B2* | 3/2006 | Lin | ........... | G11B 33/08 248/634 |
| 7,113,398 B2* | 9/2006 | Oba | ........... | G06F 1/184 345/168 |
| 7,130,187 B1* | 10/2006 | Sun | ........... | G06F 1/184 361/679.34 |
| 7,137,767 B2* | 11/2006 | Franke | ........... | F16F 1/3732 411/401 |
| 7,369,402 B2* | 5/2008 | Huang | ........... | G11B 33/08 312/223.1 |
| 7,471,509 B1* | 12/2008 | Oliver | ........... | G11B 25/043 312/223.2 |
| 7,583,516 B2* | 9/2009 | Lu | ........... | H05K 1/0271 361/807 |
| 7,599,195 B2* | 10/2009 | Chen | ........... | G06F 1/1613 361/732 |
| 7,639,490 B2* | 12/2009 | Qin | ........... | G06F 1/187 361/679.34 |
| 7,688,577 B2* | 3/2010 | Wang | ........... | G11B 33/124 361/679.35 |
| 7,839,639 B2* | 11/2010 | Najbert | ........... | G11B 33/142 361/695 |
| 8,004,830 B2* | 8/2011 | Lu | ........... | G11B 33/123 361/679.33 |
| 8,300,352 B1* | 10/2012 | Larson | ........... | G11B 33/08 360/97.11 |
| 8,432,681 B2* | 4/2013 | Tung-Ke | ........... | G11B 33/124 361/679.36 |
| 8,547,658 B1* | 10/2013 | Szeremeta | ........... | G11B 25/043 360/97.19 |
| 8,730,661 B2* | 5/2014 | Lai | ........... | G11B 33/08 361/679.33 |
| 8,842,426 B2* | 9/2014 | Chou | ........... | G06F 1/181 361/679.33 |
| 9,771,030 B1* | 9/2017 | DeHaai | ........... | H05K 5/0234 |
| 9,891,673 B2* | 2/2018 | Lee | ........... | A47B 81/00 |
| 10,082,841 B2* | 9/2018 | Lee | ........... | F16F 15/085 |
| 2002/0044416 A1* | 4/2002 | Harmon | ........... | G11B 33/08 361/679.36 |
| 2002/0051338 A1* | 5/2002 | Jiang | ........... | G11B 33/14 361/679.36 |
| 2005/0088778 A1* | 4/2005 | Chen | ........... | G11B 33/124 360/97.19 |
| 2007/0025014 A1* | 2/2007 | Kim | ........... | G06F 1/187 360/97.19 |
| 2007/0297129 A1* | 12/2007 | Liu | ........... | G11B 33/08 361/679.33 |
| 2015/0117696 A1* | 4/2015 | Lee | ........... | G06F 1/1688 381/392 |
| 2018/0032111 A1* | 2/2018 | Lee | ........... | G06F 1/1658 |

FOREIGN PATENT DOCUMENTS

| | | |
|---|---|---|
| TW | 200844338 A | 11/2008 |
| TW | 201128082 A | 8/2011 |
| TW | I533784 B | 5/2016 |

* cited by examiner

SHOCKPROOF ELEMENT AND ELECTRONIC DEVICE

CROSS REFERENCE TO RELATED APPLICATIONS

This Non-provisional application claims priority under 35 U.S.C. § 119(a) on Patent Application No(s). 108112342 filed in Taiwan, Republic of China on Apr. 9, 2019, the entire contents of which are hereby incorporated by reference.

BACKGROUND

Technology Field

The present disclosure relates to a shockproof element and an electronic device, and, in particular, to a shockproof element capable of fixing an electronic element and an electronic device including the shockproof element and the electronic element.

Related Art

With the progress of science and technology, the functionality and convenience of electronic devices have been continuously improved, and the improved electronic devices have been widely used. For example, the electronic devices include tablets, cellular phones, global position systems (GPS), personal digital assistants, palm-size PCs, and information appliances. Such electronic products are provided with electronic components for heat dissipation, data storage, or other purposes. However, the electronic components may generate vibration during operation, which causes the uncomfortable of the user.

Traditionally, the electronic element is fixed inside the electronic device by screwing. However, the above-mentioned conventional fixing method can merely provide the fixing function, but cannot decrease the vibration generated by the electronic element (no shockproof function). Moreover, the above-mentioned conventional fixing method needs an additional tool (e.g. a screwdriver), which may decrease the production speed of the electronic device and increase the manufacturing cost.

Therefore, it is an important subject to provide a shockproof element that can provide a fixing function for fixing the electronic element inside the electronic device and a shockproof function for decreasing the vibration generated by the electronic element, thereby avoiding the uncomfortable of the user.

SUMMARY

In view of the foregoing, an objective of this disclosure is to provide a shockproof element and an electronic device configured with the shockproof element. Compared with the conventional art, the shockproof element of this disclosure can decrease the vibration generated by the electronic element so as to avoid the uncomfortable of the user. In addition, the shockproof element of this disclosure can fix the electronic element inside the electronic device, so it can substitute for the conventional screws, thereby reducing the manufacturing cost and improving the production speed.

To achieve the above objective, this disclosure provides a shockproof element, which is applied to an electronic element. The shockproof element includes a first elastic portion, a second elastic portion and a connecting portion. The first elastic portion defines an opening. The second elastic portion is disposed corresponding to the first elastic portion. The second elastic portion includes a hollow column, which extends from the second elastic portion into the opening of the first elastic portion. The hollow column is configured to fix the electronic element, and the first elastic portion and the second elastic portion jointly hold the electronic element. The connecting portion connects to the first elastic portion and the second elastic portion.

In one embodiment, the electronic element includes a fastening portion, the fastening portion defines a through hole, the first elastic portion is located at one side of the fastening portion, the second elastic portion is located at another side of the fastening portion, the hollow column passes through the through hole, and the first elastic portion and the second elastic portion correspondingly hold the fastening portion.

In one embodiment, a height of the hollow column is greater than or equal to a height of the through hole.

In one embodiment, an external diameter of the hollow column is less than or equal to a diameter of the through hole.

In one embodiment, the first elastic portion, the second elastic portion and the connecting portion are integrally formed as one piece.

In one embodiment, the first elastic portion includes a first damping ring extending toward a direction away from the second elastic portion, the opening is defined by the first damping ring, and the hollow column further passes through the opening.

In one embodiment, the second elastic portion further includes a second damping ring disposed around the hollow column and extending toward a direction away from the first elastic portion.

To achieve the above objective, the present disclosure further provides an electronic device, which includes the above-mentioned shockproof element, an electronic element, a first housing, and a second housing. The electronic element includes a fastening portion, which defines a through hole. The first elastic portion is located at one side of the fastening portion, and the second elastic portion is located at another side of the fastening portion. The hollow column of the shockproof element passes through the through hole of the fastening portion. The first elastic portion and the second elastic portion correspondingly hold the fastening portion. The first housing connects to the first elastic portion of the shockproof element. The second housing connects to the first housing and includes a positioning pillar. The positioning pillar passes through the hollow column of the shockproof element for connecting the second housing to the second elastic portion of the shockproof element.

In one embodiment, a diameter of the positioning pillar is less than or equal to an inner diameter of the hollow column.

In one embodiment, the first elastic portion of the shockproof element connects to the first housing via a first damping ring, and the hollow column further passes through the opening and contacts against the first housing.

In one embodiment, the second elastic portion of the shockproof element connects to the second housing via a second damping ring.

As mentioned above, the shockproof element of this disclosure can decrease the vibration generated by the electronic element, thereby avoiding the uncomfortable of the user. In addition, the shockproof element of this disclosure includes a hollow column, which can pass through the through hole of the fastening portion of the electronic element for fixing the electronic element. Moreover, the housing of the electronic device has a positioning pillar, which can pass through the hollow column for fixing the electronic element inside the electronic device. Accordingly, the shockproof element of this disclosure can not only decrease the vibration generated by the electronic element, but also provide the fixing function of the conventional screws, thereby reducing the manufacturing cost of the electronic device and improving the production speed.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE EMBODIMENT

The present disclosure will be apparent from the following detailed description, which proceeds with reference to the accompanying drawings, wherein the same references relate to the same elements.

Figure 1A:
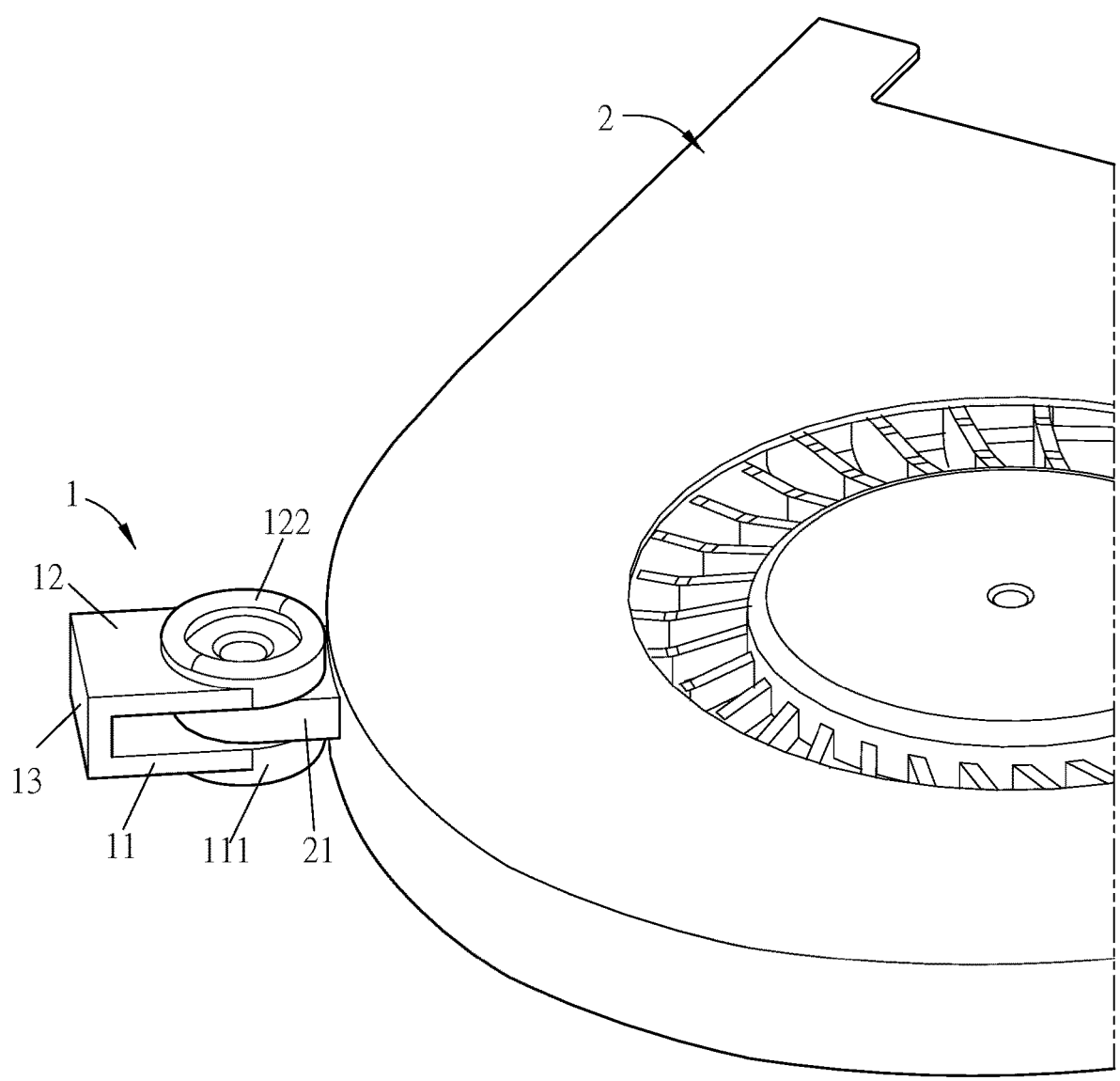
FIG. 1A is a schematic diagram showing a shockproof element of this disclosure in cooperated with an electronic element.
Figure 1B:
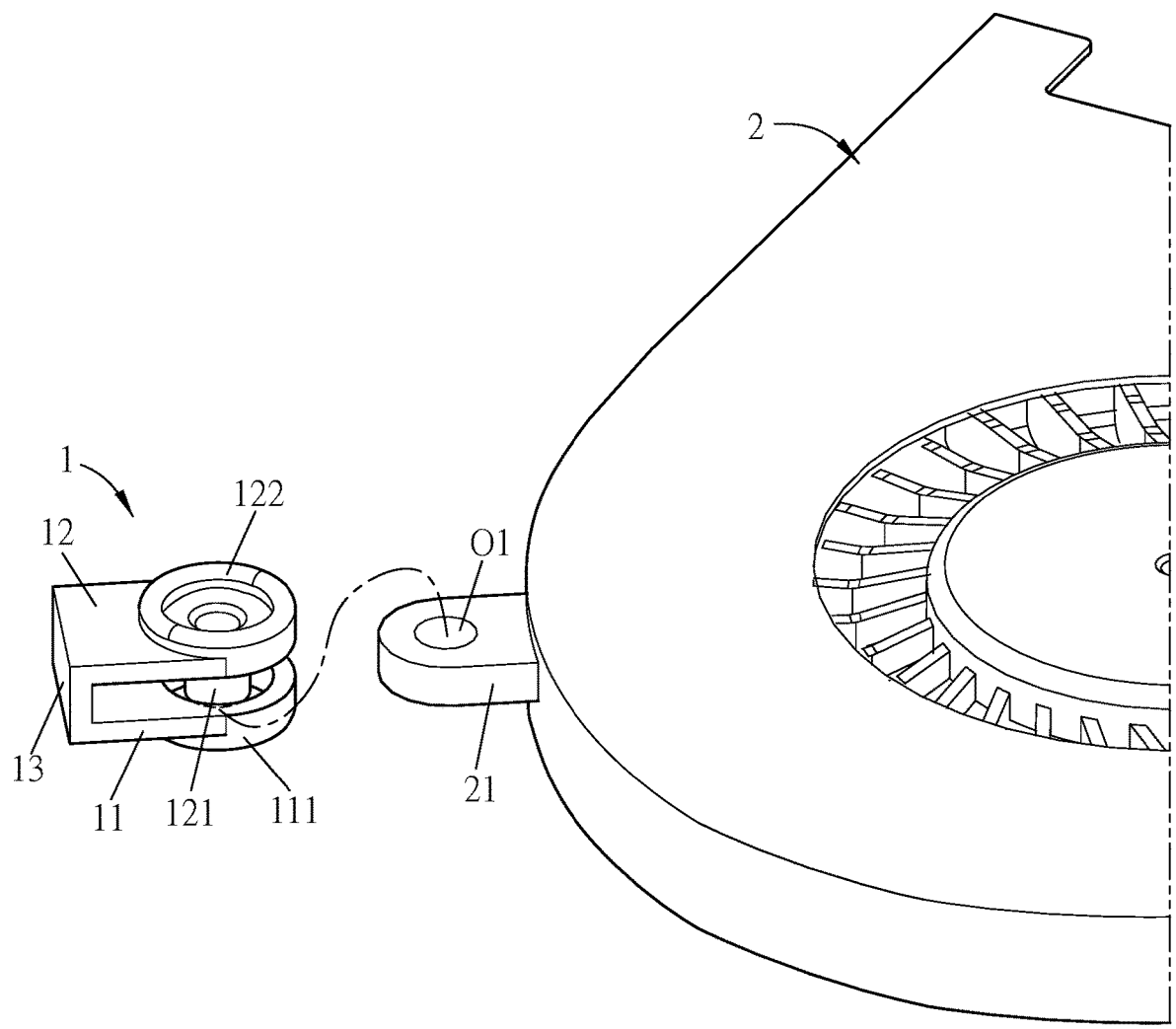
FIG. 1B is a schematic diagram showing the electronic element and the shockproof element of this disclosure, wherein the electronic element and the shockproof element are separated.

FIG. 1A is a schematic diagram showing a shockproof element of this disclosure in cooperated with an electronic element, and FIG. 1B is a schematic diagram showing the electronic element and the shockproof element of this disclosure, wherein the electronic element and the shockproof element are separated. Referring to FIGS. 1A and 1B, in this embodiment, the shockproof element 1 is applied to an electronic element 2. In this case, the electronic element 2 is a fan. To be noted, the electronic element 2 can be any of other electronic elements such as, for example but not limited to, a hard disk, a mainboard, a graphic card, or the likes, and this disclosure is not limited thereto.

Figure 1C:
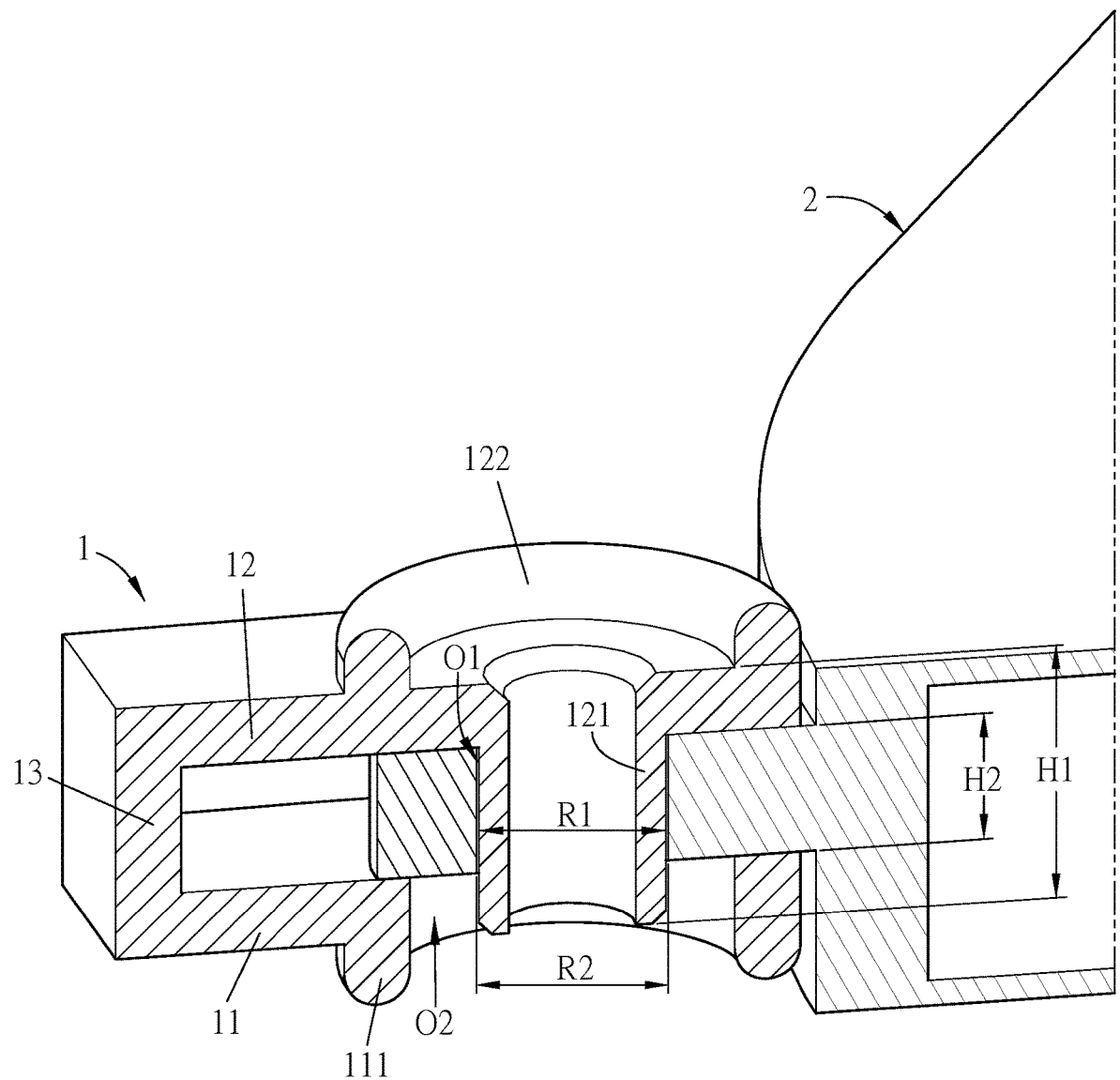
FIG. 1C is a sectional view of the electronic element and the shockproof element of FIG. 1A.
Figure 2A:
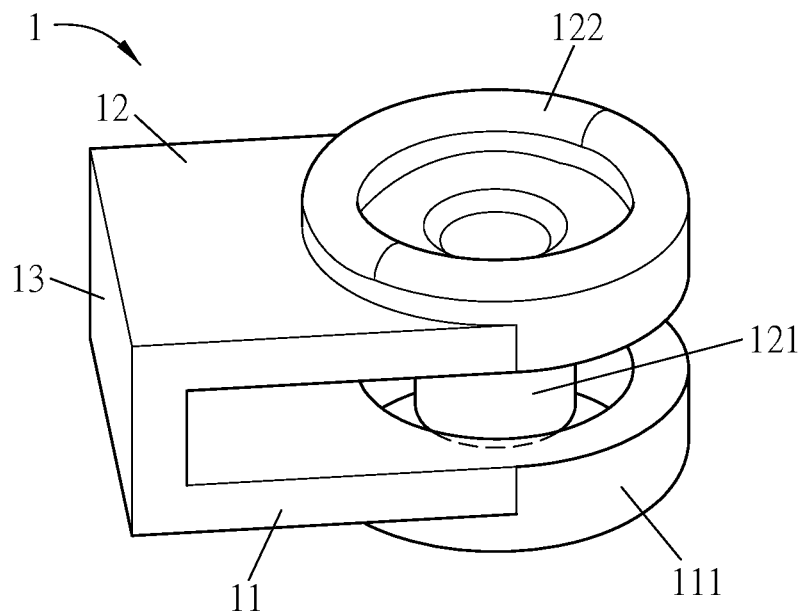
FIG. 2A is a perspective diagram of the shockproof element of this disclosure.
Figure 2B:
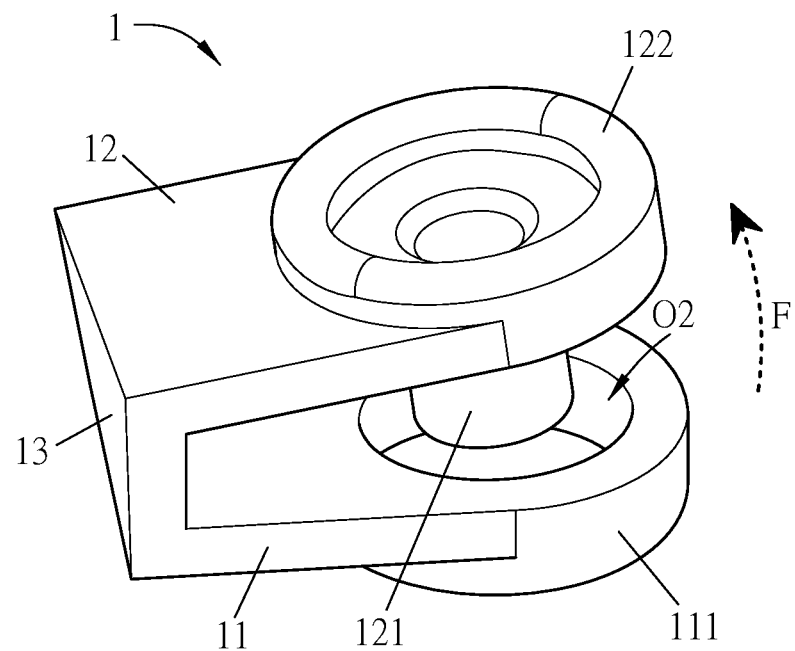
FIG. 2B is a schematic diagram showing the deformed shockproof element of FIG. 2A.

The cooperation and configuration of the shockproof element 1 and the electronic element 2 will be described hereinafter with reference to FIGS. 2A and 2B in view of FIGS. 3A to 1C. FIG. 1C is a sectional view of the electronic element 2 and the shockproof element 1 shown in FIG. 1A, FIG. 2A is a perspective diagram of the shockproof element 1 of this disclosure, and FIG. 2B is a schematic diagram showing the deformed shockproof element 1 of FIG. 2A. The shockproof element 1 includes a first elastic portion 11, a second elastic portion 12, and a connecting portion 13. The first elastic portion 11 defines an opening O2. The second elastic portion 12 includes a hollow column 121, which extends from the second elastic portion 12 toward the first elastic portion 11. As shown in figures, the hollow column 121 extends into the opening O2. The connecting portion 13 connects to the first elastic portion 11 and the second elastic portion 12. Thus, the hollow column 121 can be fixed to the electronic element 2, and the first elastic portion 11 and the second elastic portion 12 jointly hold the electronic element 2.

In this embodiment, the electronic element 2 includes a fastening portion 21, which defines a through hole O1. The shockproof element 1 can be detached from or assembled with the electronic element 2 via the through hole O1. For example, the first elastic portion 11 is located at one side of the fastening portion 21, and the second elastic portion 12 is located at another side of the fastening portion 21. Then, the hollow column 121 passes through the through hole O1 of the fastening portion 21, so that the first elastic portion 11 and the second elastic portion 12 can correspondingly hold the fastening portion 21, thereby assembling the shockproof element 1 and the electronic element 2. Specifically, when the shockproof element 1 is installed at the fastening portion 21 of the electronic element 2 (the shockproof element 1 and electronic element 2 before assembling are shown as FIG. 1B), a force can be applied to the shockproof element 1 to make the second elastic portion 12 of the shockproof element 1 generate a displacement along the direction F (see FIG. 2B). Thus, the gap between the first elastic portion 11 and the second elastic portion 12 can be enlarged, and the fastening portion 21 can be correspondingly disposed between the first elastic portion 11 and the second elastic portion 12. Then, the hollow column 121 of the second elastic portion 12 can pass through the through hole O1 of the fastening portion 21. The assembled shockproof element 1 and electronic element 2 are shown as FIGS. 1A and 1C.

In this embodiment, the first elastic portion 11, the second elastic portion 12, and the connecting portion 13 can be integrally formed as one piece. Specifically, the shockproof element 1 is made of elastic material such as, for example but not limited to, rubber, silica gel, plastics, or polymers.

In this embodiment, the first elastic portion 11 includes a first damping ring 111 extending toward a direction away from the second elastic portion 12. The opening O2 of the first elastic portion 11 is defined by the first damping ring 111, and the hollow column 121 can further pass through the opening O2. Thus, when assembling the shockproof element 1 and the electronic element 2, the above structure can prevent the loosening of the hollow column 121 from the through hole O1 of the fastening portion 21, thereby further tightly fixing the shockproof element 1 to the fastening portion 21. The first damping ring 111 is configured to provide a buffering function for decreasing the vibration generated by the electronic element 2.

In this embodiment, the second elastic portion 12 further includes a second damping ring 122 disposed around the hollow column 121 and extending toward a direction away from the first elastic portion 11. The second damping ring 122 is configured to provide a buffering function for decreasing the vibration generated by the electronic element 2.

Referring to FIG. 1C, in this embodiment, the height H1 of the hollow column 121 is greater than or equal to the height H2 of the through hole O1. This configuration can prevent the loosening of the hollow column 121 from the through hole O1, thereby avoiding the detachment of the shockproof element 1 and the fastening portion 21 (the electronic element 2). In addition, the external diameter R1 of the hollow column 121 is less than or equal to the diameter R2 of the through hole O1, so that the hollow column 121 can pass through the through hole O1.

Figure 3A:
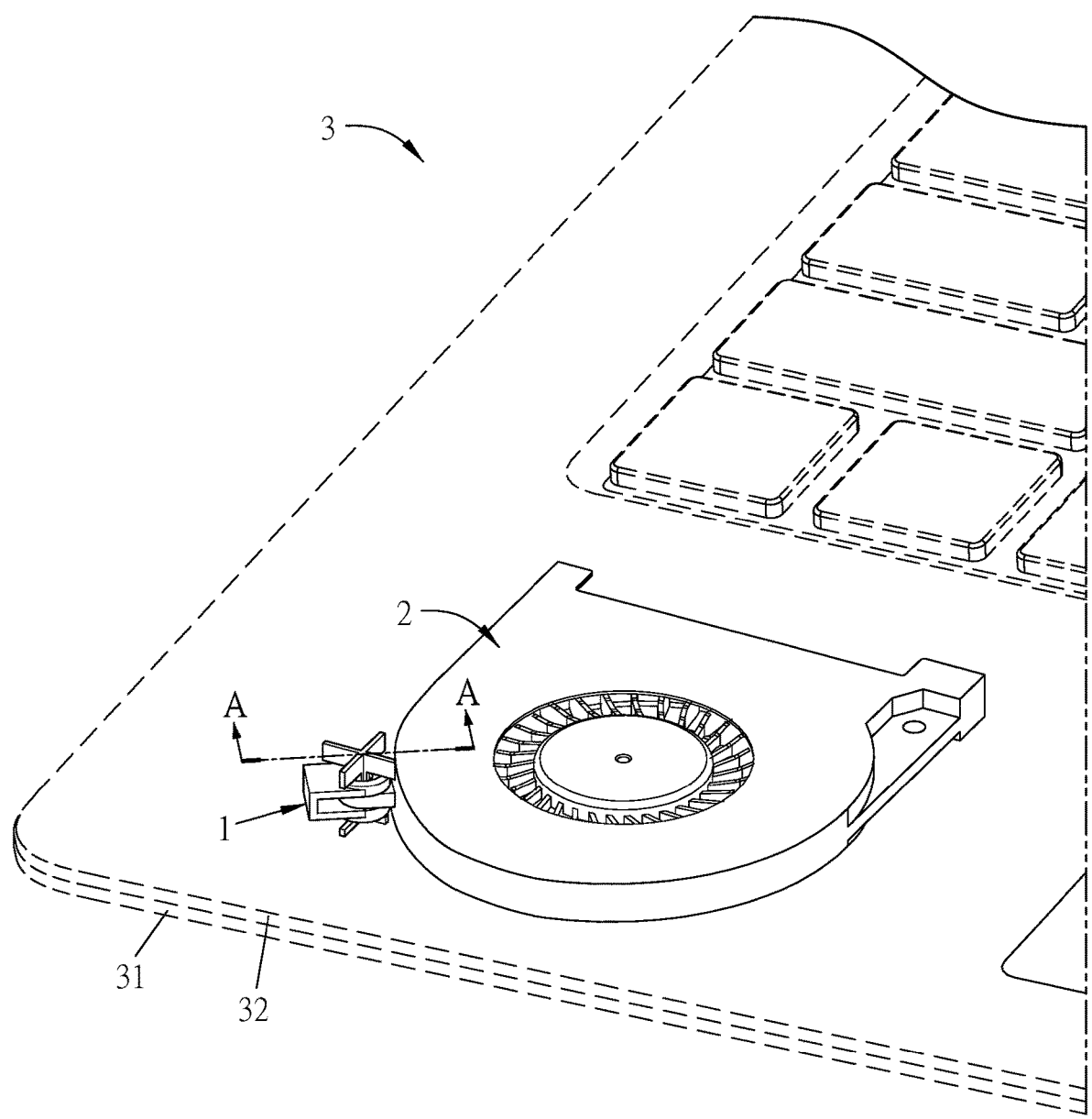
FIG. 3A is a schematic diagram showing a part of an electronic device of this disclosure.

FIG. 3A is a schematic diagram showing a part of an electronic device 3 of this disclosure. To be noted, FIG. 3A only shows the shockproof element 1, the electronic element 2, a part of a first housing 31, and a part of a second housing 32 in the electronic device 3, and the first housing 31 and the second housing 32 are shown by dotted lines for sake of clearly showing the shockproof element 1 and the electronic element 2. Referring to FIG. 3A, in this embodiment, the electronic device 3 includes a shockproof element 1, an electronic element 2, a first housing 31, and a second housing 32. To be noted, the components of the shockproof element 1 and the electronic element 2 can be referred to the above embodiment, so the detailed descriptions thereof will be omitted. In this case, the electronic element 2 is, for example, a fan. To be noted, the electronic element 2 can be any of other electronic elements such as, for example but not limited to, a hard disk, a mainboard, a graphic card, or the likes, and this disclosure is not limited thereto. In addition, the electronic device 3 is, for example, a notebook computer. To be noted, the electronic device 3 can be any of other electronic devices such as, for example but not limited to, a tablet, a cellular phone, a global position system (GPS), a personal digital assistant, a palm-size PC, an information appliance, or the likes, and this disclosure is not limited thereto. Particularly, the electronic device 3 of this embodiment includes one shockproof element 1 and an electronic element 2 with one fastening portion 21. To be noted, the amounts of the shockproof element 1, the electronic element 2 and the fastening portion 21 can be modified based on the requirement of the user, and this disclosure is not limited only if the amount of the shockproof element 1 is equal to the amount of the fastening portion 21.

Figure 3B:
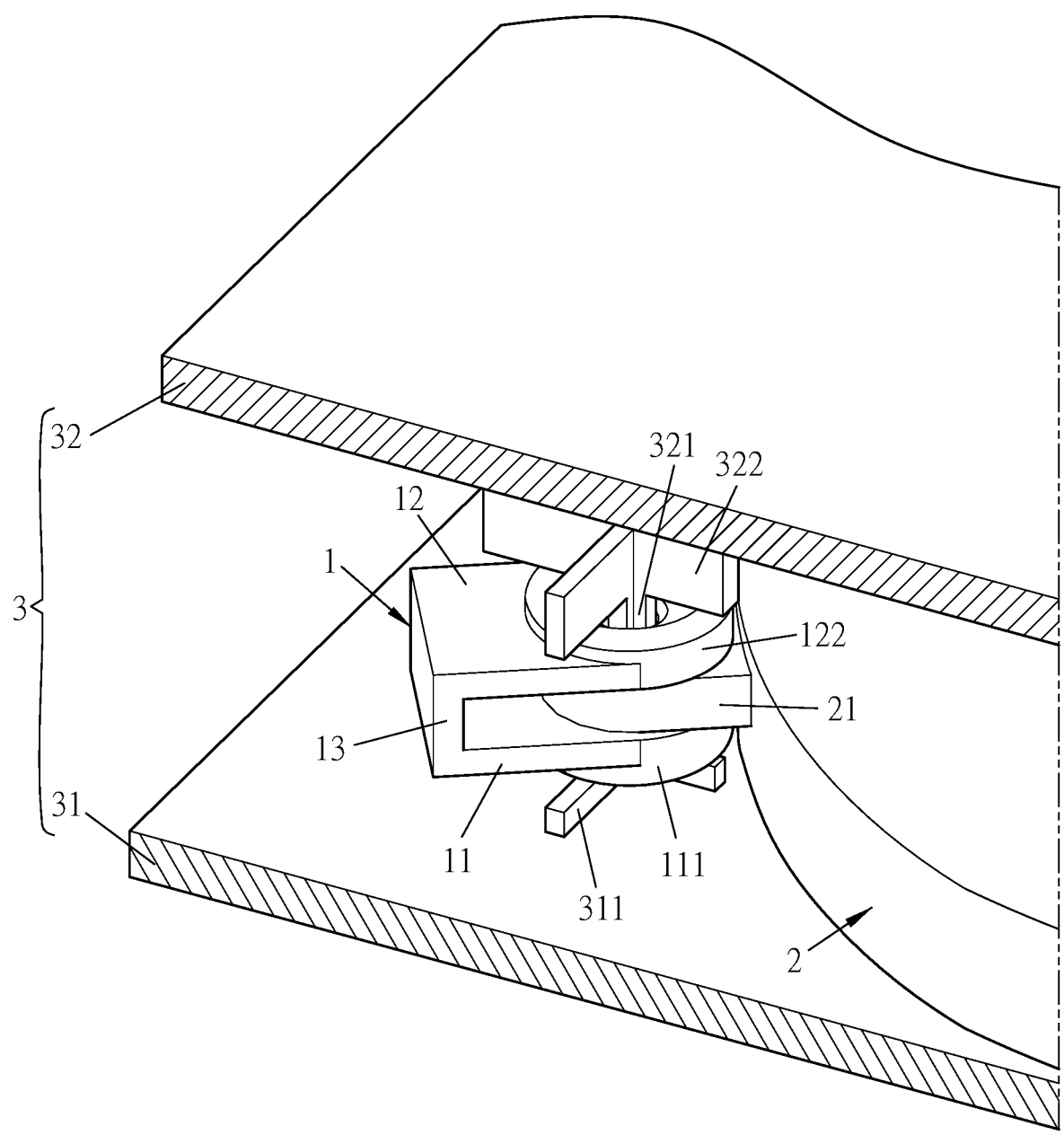
FIG. 3B is a sectional view of the electronic device of FIG. 3A.
Figure 3C:
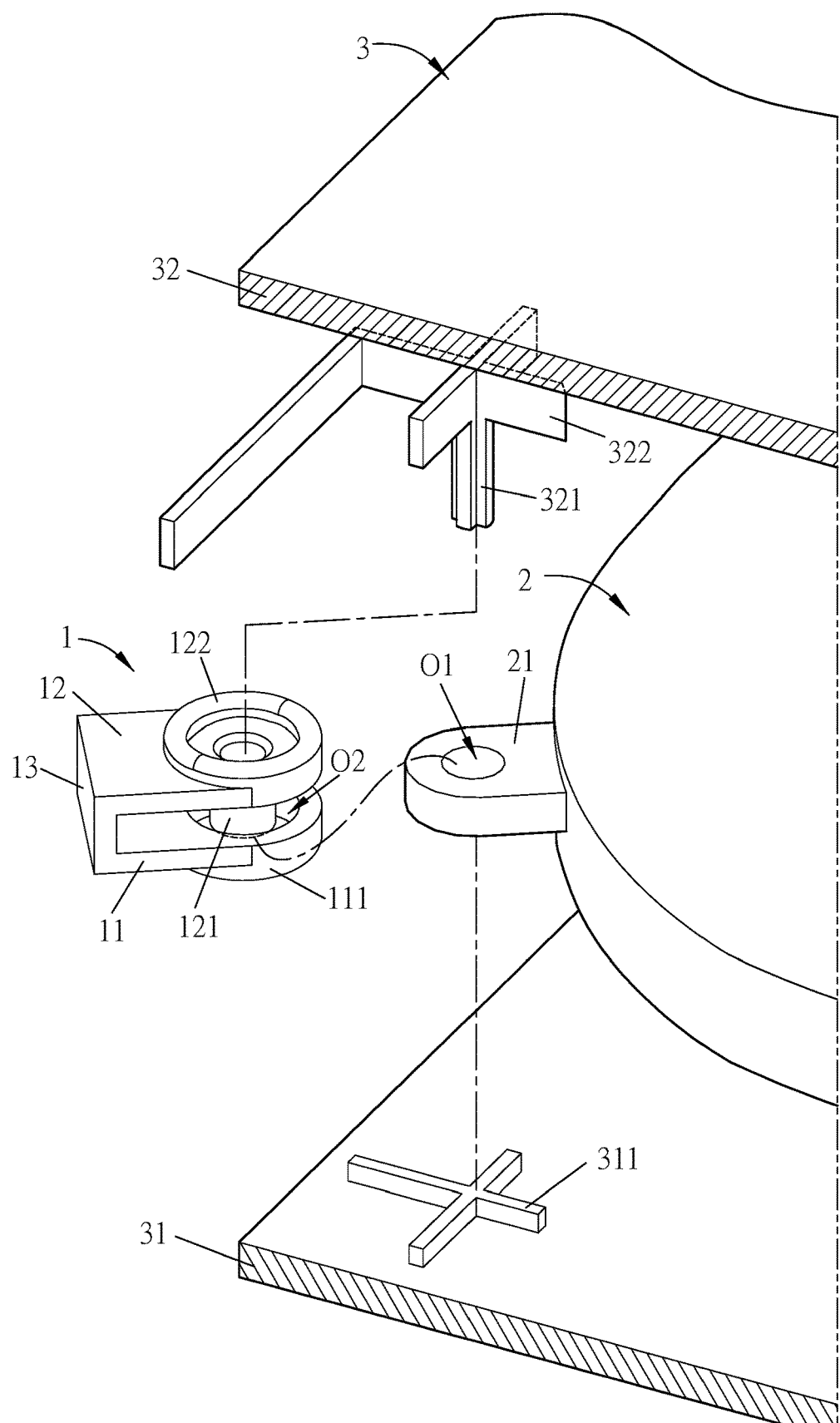
FIG. 3C is a schematic diagram of the electronic device of FIG. 3A, wherein the housing, the shockproof element and the electronic element are separated.

FIG. 3B is a sectional view of the electronic device of FIG. 3A, and FIG. 3C is a schematic diagram of the electronic device of FIG. 3A, wherein the housing, the shockproof element, and the electronic element are separated. Referring to FIGS. 3B and 3C, in this embodiment, the first housing 31 connects to the first elastic portion 11 of the shockproof element 1. The second housing 32 connects to the first housing 31 and includes a positioning pillar 321. The positioning pillar 321 passes through the hollow column 121 of the shockproof element 1 for connecting the second housing 32 to the second elastic portion 12 of the shockproof element 1. Particularly, in this embodiment, the first housing 31 includes a first rib 311, the second housing 32 includes a second rib 322, and the positioning pillar 321 is disposed on the second rib 322. The first housing 31 is connected with the first elastic portion 11 of the shockproof element 1 through the first rib 311, and the second housing 32 is connected with the second elastic portion 12 of the shockproof element 1 through the positioning pillar 321 and the second rib 322. To be noted, the first housing 31 can be directly connected with the first elastic portion 11 of the shockproof element 1, and the second housing 32 can be directly connected with the second elastic portion 12 of the shockproof element 1 through the positioning pillar 321. This disclosure is not limited thereto. In addition, the amounts and shapes of the first rib 311 and the second rib 322 can be modified based on the requirement of the user, and this disclosure is not limited.

Figure 3D:
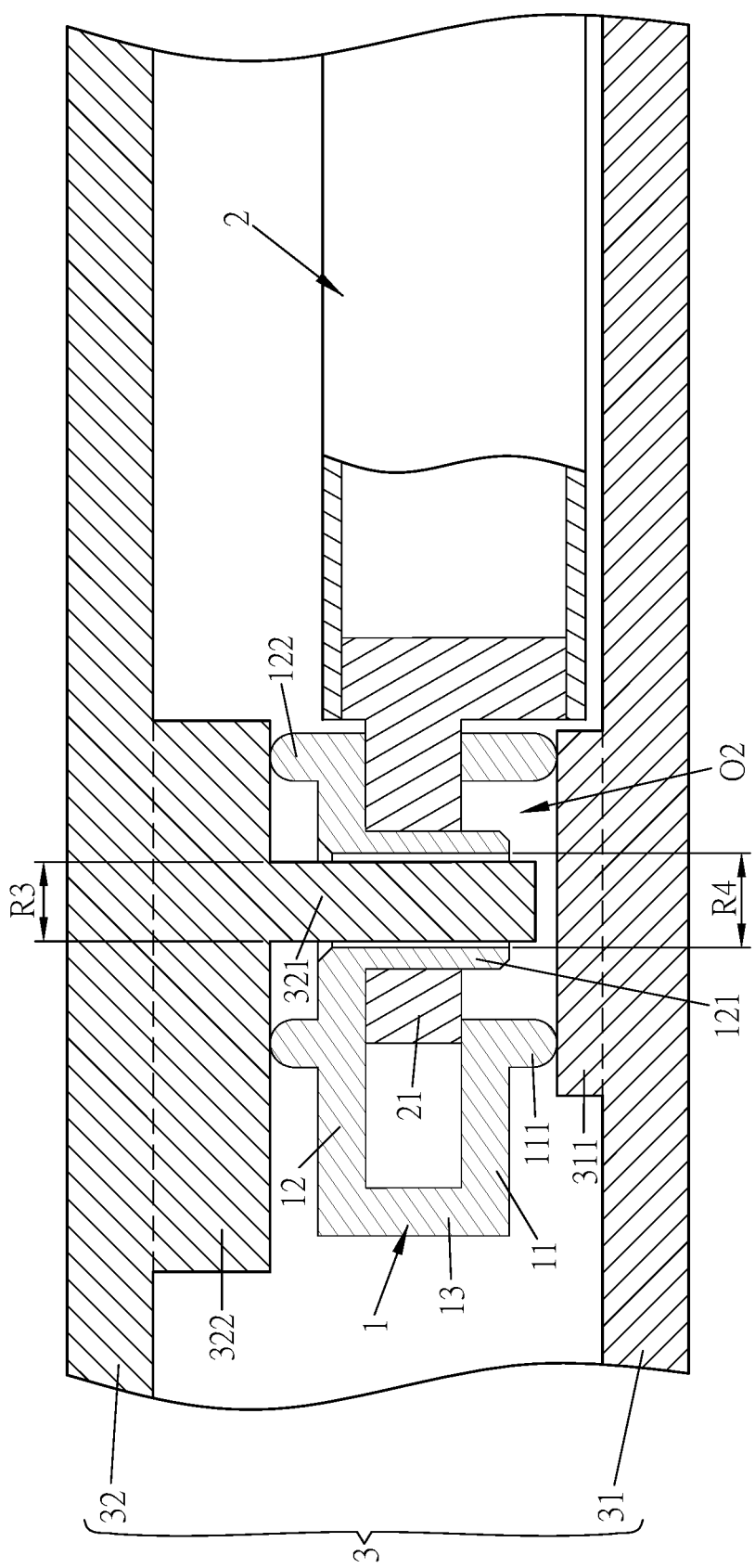
FIG. 3D is a sectional view of the electronic device of FIG. 3A along the line A-A.

FIG. 3D is a sectional view of the electronic device of FIG. 3A along the line A-A. Referring to FIGS. 3B and 3D, in this embodiment, the first elastic portion 11 of the shockproof element 1 connects to the first housing 31 via the first damping ring 111, and the hollow column 121 further passes through the opening O2 and contacts against the first housing 31. The second elastic portion 12 of the shockproof element 1 connects to the second housing 32 via the second damping ring 122. Although the figures only show that the hollow column passes through the opening O2, in practice, the hollow column 121 further protrudes from the opening O2 and contacts against the first housing 31. This configuration can prevent the displacement of the shockproof element 1 and the electronic element 2 with respect to the first housing 31 and the second housing 32, thereby tightly fixing the shockproof element 1 and the electronic element 2 between the first housing 31 and the second housing 32. The first damping ring 111 and the second damping ring 122 are connected with the first housing 31 and the second housing 32, respectively. This configuration can provide the buffering function and more firmly connect the shockproof element 1 to the first housing 31 and the second housing 32, thereby reducing and/or decreasing the vibration of the electronic element 2. In this embodiment, the first housing 31 is connected with the first damping ring 111 of the first elastic portion 11 of the shockproof element 1 through the first rib 311, and the second housing 32 is connected with the second damping ring 122 of the second elastic portion 12 of the shockproof element 1 through the positioning pillar 321 and the second rib 322. To be noted, the first housing 31 can be directly connected with the first elastic portion 11 of the shockproof element 1, and the second housing 32 can be directly connected with the second elastic portion 12 of the shockproof element 1 through the positioning pillar 321. This disclosure is not limited thereto only if the shockproof element 1 can tightly connect to the first housing 31 and the second housing 32. In this case, the configuration of the first rib 311 and the second rib 322 can more tightly connect the shockproof element 1 to the first housing 31 and the second housing 32, thereby reducing and/or decreasing the vibration generated by the electronic element 2.

Referring to FIGS. 3C and 3D, in this embodiment, the diameter R3 of the positioning pillar 321 is less than or equal to the inner diameter R4 of the hollow column 121, so that the positioning pillar 321 can pass through the hollow column 121. Accordingly, the electronic element 2 can be fixed inside the housing of the electronic device 3 by passing the hollow column 121 of the shockproof element 1 through the through hole O1 of the fastening portion 21 of the electronic element 2 and passing the positioning pillar 321 of the second housing 32 of the electronic device 3 through the hollow column 121. This design can replace the conventional screws, thereby decreasing the manufacturing cost of the electronic device 3 and increasing the production speed.

In summary, the shockproof element 1 of this disclosure can decrease the vibration generated by the electronic element 2, thereby avoiding the uncomfortable of the user. In addition, the shockproof element 1 of this disclosure includes a hollow column 121, which can pass through the through hole O1 of the fastening portion 21 of the electronic element 2 for fixing the shockproof element 1 on the electronic element 2. Moreover, the housing 32 of the electronic device 3 has a positioning pillar 321, which can pass through the hollow column 121 for fixing the electronic element 2 inside the electronic device 3. Accordingly, the shockproof element 1 of this disclosure can not only decrease the vibration generated by the electronic element 2, but also provide the fixing function of the conventional screws, thereby reducing the manufacturing cost of the electronic device 3 and improving the production speed.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A shockproof element applied to an electronic element, comprising:
   a first elastic portion defining an opening;
   a second elastic portion disposed corresponding to the first elastic portion, wherein the second elastic portion comprises a hollow column, the hollow column extends from the second elastic portion into the opening of the first elastic portion, the hollow column is configured to fix the electronic element, and the first elastic portion and the second elastic portion jointly hold the electronic element; and
   a connecting portion connecting to the first elastic portion and the second elastic portion.

2. The shockproof element of claim 1, wherein the electronic element comprises a fastening portion, the fastening portion defines a through hole, the first elastic portion is located at one side of the fastening portion, the second elastic portion is located at another side of the fastening portion, the hollow column passes through the through hole, and the first elastic portion and the second elastic portion correspondingly hold the fastening portion.

3. The shockproof element of claim 2, wherein a height of the hollow column is greater than or equal to a height of the through hole.

4. The shockproof element of claim 2, wherein an external diameter of the hollow column is less than or equal to a diameter of the through hole.

5. The shockproof element of claim 1, wherein the first elastic portion, the second elastic portion and the connecting portion are integrally formed as one piece.

6. The shockproof element of claim 1, wherein the first elastic portion comprises a first damping ring extending toward a direction away from the second elastic portion, the opening is defined by the first damping ring, and the hollow column further passes through the opening.

7. The shockproof element of claim 6, wherein the second elastic portion further comprises a second damping ring disposed around the hollow column and extending toward a direction away from the first elastic portion.

8. An electronic device, comprising:
   the shockproof element of claim 1;
   an electronic element, wherein the electronic element comprises a fastening portion, the fastening portion defines a through hole, the first elastic portion is located at one side of the fastening portion, the second elastic portion is located at another side of the fastening portion, the hollow column of the shockproof element passes through the through hole of the fastening portion, and the first elastic portion and the second elastic portion correspondingly hold the fastening portion;
   a first housing connecting to the first elastic portion of the shockproof element; and
   a second housing connecting to the first housing and comprising a positioning pillar, wherein the positioning pillar passes through the hollow column of the shockproof element for connecting the second housing to the second elastic portion of the shockproof element.

9. The electronic device of claim 8, wherein a diameter of the positioning pillar is less than or equal to an inner diameter of the hollow column.

10. The electronic device of claim 8, wherein the first elastic portion of the shockproof element connects to the first housing via a first damping ring, and the hollow column further passes through the opening and contacts against the first housing.

11. The electronic device of claim 10, wherein the first elastic portion comprises the first damping ring extending toward a direction away from the second elastic portion, the opening is defined by the first damping ring, and the hollow column further passes through the opening.

12. The electronic device of claim 8, wherein the second elastic portion of the shockproof element connects to the second housing via a second damping ring.

13. The electronic device of claim 12, wherein the second elastic portion further comprises the second damping ring disposed around the hollow column and extending toward a direction away from the first elastic portion.

14. The electronic device of claim 8, wherein a height of the hollow column is greater than or equal to a height of the through hole.

15. The electronic device of claim 8, wherein an external diameter of the hollow column is less than or equal to a diameter of the through hole.

16. The electronic device of claim 8, wherein the first elastic portion, the second elastic portion and the connecting portion are integrally formed as one piece.

* * * * *